United States Patent [19]

Ross

[11] 4,421,017

[45] Dec. 20, 1983

[54] ROTISSERIE ACCESSORY FOR PREPARING FOWL

[75] Inventor: John Ross, Akron, Ohio

[73] Assignee: The Collectors Box, Akron, Ohio

[21] Appl. No.: 470,054

[22] Filed: Feb. 28, 1983

[51] Int. Cl.³ .............................................. A47J 43/18
[52] U.S. Cl. ................................. 99/421 R; 99/421 H; 99/426; 99/449
[58] Field of Search ...................... 99/351, 419, 421 R, 99/421 H, 426, 427, 441, 449; 269/254 CS

[56] References Cited

U.S. PATENT DOCUMENTS

| | | | |
|---|---|---|---|
| 1,741,400 | 12/1929 | Bocchino | 99/421 H |
| 2,583,913 | 1/1952 | Weiterschan | 99/426 |
| 2,850,962 | 9/1958 | Beavers | 99/419 |
| 3,247,827 | 4/1966 | Cremer | 99/421 H |
| 3,447,445 | 12/1966 | Koziol | 99/421 R |
| 4,369,697 | 1/1983 | Millington | 99/351 |

Primary Examiner—Billy J. Wilhite
Assistant Examiner—Christine A. Peterson
Attorney, Agent, or Firm—Hamilton, Renner & Kenner

[57] ABSTRACT

A device for aiding in the preparation of fowl (10) on a rotisserie having a spit (11), the spit (11) extending longitudinally through the fowl (10) between the wings (12) and between the legs (13) thereof. A leg clip (15) fixedly positions the legs (13) of the fowl (10) relative to the spit (11). The wings (12) are held in place by a truss member (24) which is held by a pin (22) extending through the body of the fowl (10).

10 Claims, 3 Drawing Figures

ROTISSERIE ACCESSORY FOR PREPARING FOWL

TECHNICAL FIELD

This invention relates to an accessory for a rotisserie, such as used in outdoor barbecue cooking, which aids in the preparation of fowl such as chicken, turkey or the like. More particularly, this invention relates to a device which holds the fowl onto the spit of the rotisserie.

BACKGROUND ART

Both the professional and the backyard chef have long been plagued by the problem of securely fastening fowl, such as chicken, to the spit of a rotisserie. The conventional tines used to hold meat on a spit are simply insufficient to hold certain portions of the anatomy of a chicken, such as the legs and wings which, if unrestrained, severly flop about as the spit rotates. Such activity may not only char these areas of the chicken but will also cause an inbalance of the load on the spit. Thus, in addition to the tines, the chicken must be otherwise fastened to the spit. Usually cord and/or skewers and/or tacks are used for this purpose. When using cord, a thorough job requires that cord be first looped around the wings of the chicken and then tightened around the body. The legs of the fowl are similarly bound, usually after being crossed. Then the cord around the wings and the cord around the legs are usually bound together with another cord for maximum security against the charring of the legs or wings. When more than one chicken is to be barbecued on the same spit, a set of holding tines, and separate binding as just described, is required for each chicken. All of these procedures are quite time consuming and often frustrating to the barbecue chef.

DISCLOSURE OF THE INVENTION

It is thus a primary object of the present invention to provide a device for easily attaching fowl to the spit of a rotisserie.

It is a further object of the present invention to provide a device, as above, which eliminates the need to use skewers which might work loose or cord which is difficult to work with and which easily burns when preparing fowl on a spit.

It is another object of the present invention to provide a device, as above, which can be used to prepare multiple fowl without the need for multiple pairs of holding tines, additional cord, skewers or other paraphernalia.

These and other objects of the present invention, which will become apparent from the description to follow, are accomplished by the means hereinafter described and claimed.

In general, a device for holding the wings and legs of a fowl onto the spit of a rotisserie with the spit extending longitudinally through the fowl between its wings and between its legs includes a pin which extends laterally through the body of the fowl at a point near the wings thereof. A truss member is held at each end by the pin and extends around the wings of the fowl to hold them tightly against the body of the fowl. A leg clip fixedly positions the legs of the fowl relative to the spit.

PREFERRED EMBODIMENT FOR CARRYING OUT THE INVENTION

Figure 1:
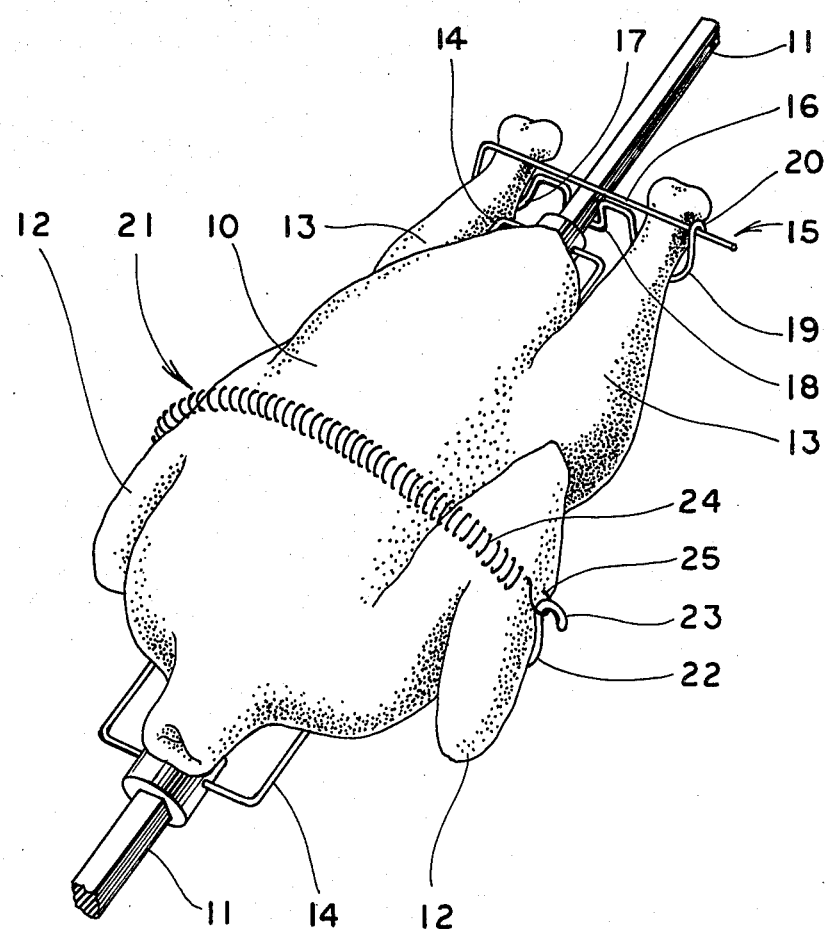
FIG. 1 is a somewhat schematic perspective view of a fowl on a spit and being held thereto by the device of the present invention.

Shown in FIG. 1 is a fowl, such as a chicken 10, which has a conventional spit 11 of a rotisserie extending longitudinally therethrough between the wings 12 and legs 13 of the chicken 10. Conventional meat holding tines 14 are placed in the chicken in the normal fashion to initially secure the body of the chicken on the spit.

A leg holding clip is indicated generally by the numeral 15 and is preferably formed of a spring steel. Clip 15 is a continuous member and is formed to include a laterally extending lock bar 16 which is bent at approximately 90° to form a first leg loop 17 opposed to lock bar 16. A spit notch 18 is formed adjacent leg loop 17 and then a second leg loop 19 is formed in clip 15. Clip 15 terminates in a hook member 20 adjacent leg loop 19. In order to secure the legs 13 of chicken 10, lock bar 16 is moved out of engagement with hook member 20. Then notch 18 of clip 15 is slid onto spit 11 while legs 13 are inserted into loops 17 and 19. Then bar 16 is clipped onto hook member 20 which holds the spring steel bar 16 in a locked position and the legs of the chicken are thereby securely confined and fixed in position relative to the spit. Although FIG. 1 shows bar 16 over spit 11 and notch 18 under spit 11, it should be evident that these positions could be reversed.

Figure 2:
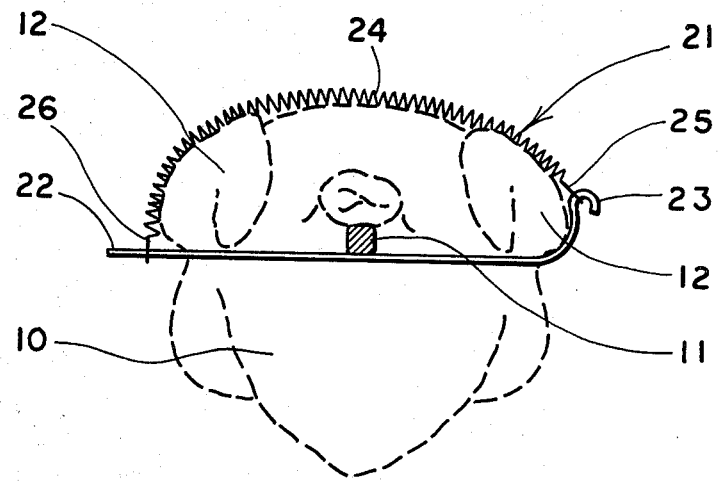
FIG. 2 is a view of the device of the present invention showing the portion thereof which holds the wings of the fowl and showing a front view of the fowl in phantom.
Figure 3:
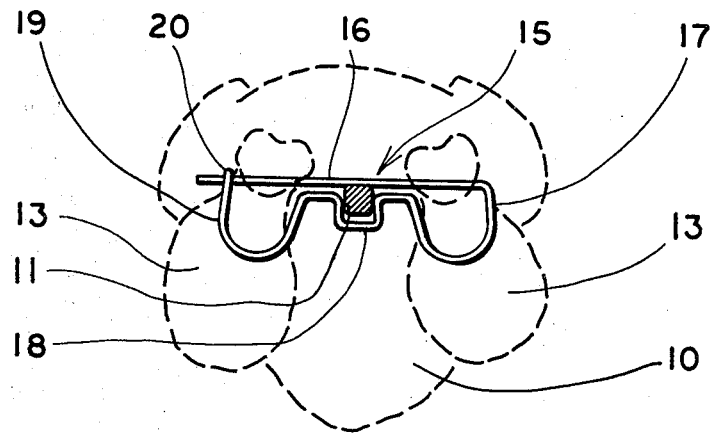
FIG. 3 is a view of the device of the present invention showing the portion thereof which holds the legs of the fowl and showing a rear view of the fowl in phantom.

A wing holding truss member is indicated generally by the numeral 21 in FIGS. 1 and 2. A generally laterally extending wing pin 22 is pushed through the body of chicken 10 preferably at a point just behind and beneath the location where wings 12 join the body of the chicken. As shown in FIG. 2, pin 22 preferably extends below spit 11 although it is not mandatory to the efficient operation of the device. One end of pin 22 is curved upwardly to form a hook 23. After pin 22 has been inserted into and through chicken 10, a truss spring 24, having loops 25 and 26 at the ends thereof, is attached to pin 22. As shown, loop 25 is placed over hook 23 and spring 24 is stretched over the folded wings 12 and loop 26 is placed over the protruding end of pin 22. A stainless steel extension spring 24 three inches long when not extended and capable of expansion to eight inches with no more than ten pounds force has been found to be satisfactory for the size of most fowl normally encountered.

When cooking more than one chicken on a spit, it has been found that only one set of meat holding tines 14 is required because of the secure nature of the binding according to the invention herein. Thus, when preparing more than one fowl, only one meat holder is put in place (at the legs of the fowl) and the fowl is then attached with clip 15 and truss member 21 as just described. Then the next fowl is put on the spit, a clip 15 attached, and the fowl is slid down the spit until the legs of the second fowl ride onto the back of the first. The second fowl is then secured with another truss member 21. After the last fowl is so fastened, the other tine 14 should be mounted in the neck end of the last fowl.

It should thus be apparent that the rotisserie accessory described herein efficiently attaches a fowl to a spit and otherwise accomplishes the objects of the present invention.

I claim:

1. Apparatus for confining the wings and legs of a fowl, the fowl being mounted on the spit of a rotisserie with the spit extending longitudinally through the fowl between its wings and between its legs comprising, pin means extending generally laterally through the body of the fowl near the wings thereof, truss means extending around the wings of the fowl and held by each end of said pin means, and leg clip means fixedly positioning the legs of the fowl relative to the spit.

2. Apparatus according to claim 1 wherein said leg clip means includes loops to confine the legs of the fowl and lock means opposed to said loops to maintain the legs within said loops.

3. Apparatus according to claim 2 wherein said leg clip means further includes notch means between said loops to engage the spit, said lock means also being opposed to said notch means to maintain the spit within said notch means.

4. Apparatus according to claim 3 wherein said loops and said notch means are on one side of the spit and said lock means is positioned on the other side of the spit.

5. Apparatus according to claim 3 wherein said leg clip means further includes means to maintain said lock means in a locked position.

6. Apparatus according to claim 5 wherein said means to maintain is a hook formed in said leg clip means adjacent one of said loops.

7. Apparatus according to claim 1 wherein said pin means has a hook at one end thereof to hold said truss means.

8. Apparatus according to claim 1 wherein said truss means has a loop at each end to engage said pin means.

9. Apparatus according to claim 8 wherein said truss means is an extension spring.

10. Apparatus according to claim 1 wherein said pin means is inserted into the fowl at a point just behind and beneath the location where the wings of the fowl join the body of the fowl and on one side of the spit, said truss means extending around the fowl on the other side of the spit.

* * * * *